(12) United States Patent
Coffinberry

(10) Patent No.: US 7,406,829 B2
(45) Date of Patent: Aug. 5, 2008

(54) CRYOGENIC LIQUID OXIDIZER COOLED HIGH ENERGY SYSTEM

(75) Inventor: George Albert Coffinberry, West Chester, OH (US)

(73) Assignee: General Electric Company, Schenectady, NY (US)

( * ) Notice: Subject to any disclaimer, the term of this patent is extended or adjusted under 35 U.S.C. 154(b) by 582 days.

(21) Appl. No.: 11/131,690

(22) Filed: May 18, 2005

(65) Prior Publication Data

US 2006/0078034 A1 Apr. 13, 2006

Related U.S. Application Data

(60) Provisional application No. 60/581,193, filed on Jun. 18, 2004.

(51) Int. Cl.
*F02C 6/08* (2006.01)
*F02C 6/14* (2006.01)
(52) U.S. Cl. .................. 60/801; 60/785; 60/39.17; 60/727; 372/35; 89/1.11
(58) Field of Classification Search .............. 60/801, 60/257, 260, 791, 39.17, 39.83, 726, 727, 60/785; 89/1.11; 372/34, 35; 310/54
See application file for complete search history.

(56) References Cited

U.S. PATENT DOCUMENTS

| | | | | |
|---|---|---|---|---|
| 3,208,216 A | * | 9/1965 | Silvern et al. ............ 60/39.17 |
| 3,229,459 A | * | 1/1966 | Cervenka ................. 60/257 |
| 3,410,092 A | * | 11/1968 | Goldstein ................ 60/257 |
| 3,668,549 A | * | 6/1972 | Biancardi et al. .......... 372/34 |
| 3,796,045 A | * | 3/1974 | Foster-Pegg ............. 60/39.83 |
| 4,329,842 A | * | 5/1982 | Hoskinson ............... 60/727 |
| 5,020,411 A | * | 6/1991 | Rowan .................. 89/1.11 |

(Continued)

FOREIGN PATENT DOCUMENTS

WO WO9942706 * 8/1999

OTHER PUBLICATIONS

"Tactical High Energy Laser", Copyright 2002 Society of Photo-Optical Instrumentation Engineers, SPIE Proceedings on Laser and Beam Control Technologies, vol. 4632, Jan. 21, 2002, 11 pages.

(Continued)

*Primary Examiner*—Ted Kim
(74) *Attorney, Agent, or Firm*—William Scott Andes; Steven J. Rosen

(57) ABSTRACT

A high energy system comprising a high energy electrical device powered by an electrical generator both of which are cooled by a cryogenic liquid oxidant stored in a storage tank. A power turbine powered by a combustor using fuel and the oxidant drives the electrical generator. A turbopump powered by a portion of exhaust flow from the power turbine pumps the cryogenic liquid oxidant from the storage tank to the generator and the device. In an exemplary embodiment of the system, the electrical device is a directed energy weapon, uses liquid air as the liquid oxidant, and uses a variable geometry turbine nozzle in the power turbine. A reheater may be used between a high pressure turbine and a lower pressure turbine of the power turbine. Compressor bleed from a gas turbine engine may provide air augmentation to the power turbine.

22 Claims, 5 Drawing Sheets

U.S. PATENT DOCUMENTS

| | | | |
|---|---|---|---|
| 5,956,937 A * | 9/1999 | Beichel | 60/39.17 |
| 5,974,072 A * | 10/1999 | Hartlove et al. | 89/1.11 |
| 6,178,733 B1 * | 1/2001 | Nelson | 60/39.83 |
| 6,338,253 B1 | 1/2002 | Freedman | |
| 6,920,759 B2 * | 7/2005 | Wakana et al. | 60/726 |
| 7,044,044 B2 * | 5/2006 | Rodriguez et al. | 89/1.11 |
| 2003/0198264 A1 * | 10/2003 | Vetrovec et al. | 372/35 |
| 2004/0056792 A1 | 3/2004 | Miron | |
| 2004/0102109 A1 | 5/2004 | Cratty et al. | |
| 2005/0039885 A1 | 2/2005 | Vaidyanathan et al. | |
| 2005/0094373 A1 | 5/2005 | Weber et al. | |

OTHER PUBLICATIONS

Propulsion Directorate, Monthly Accomplishment Report, Sep. 2001, Contents, p. 2, p. 3, and p. 9.

"ABL Weapon System Elements", Boeing Missile Defense: Airborne Laser System Description—Hardware Updates, h t t p : / / w w w . boeing.com/defense—space/military/abl/hardware_updates.html, May 12, 2005.

"The Speed Of Light", Aviation Week & Space Technology, by Amy Butler, May 2, 2005, pp. 48-53.

* cited by examiner

CRYOGENIC LIQUID OXIDIZER COOLED HIGH ENERGY SYSTEM

CROSS REFERENCE TO RELATED APPLICATIONS

This application claims priority to U.S. Provisional Patent Application No. 60/581,193, filed on Jun. 18, 2004, the entire disclosure of which is incorporated herein by reference.

BACKGROUND OF THE INVENTION

Field of the Invention

The present invention relates generally to high energy systems such as directed energy weapon (DEW) systems that incorporate very high power devices such as directed energy weapons.

High energy systems that incorporate very high power devices are being studied and developed for a variety of applications. One area of high energy systems under very active development is directed energy controlled effects, also referred to as Directed Energy Weapons (DEW). Sea based, ground, and DEW systems are being developed to provide missile defense as well as other defense related capabilities. DEW include microwave energy to disrupt enemy electronics, laser energy to damage or destroy targets and particle beam energy to damage or destroy targets.

Large amounts of electrical energy are needed for these DEW devises on the order of 1 to 5 megawatts. Some present designs incorporate cryogenic liquid fluid to provide super electrical conductivity for use in the generator. It is currently envisioned that a gas turbine engine will drive the generator. Heat exchangers will be used to cool the generator and DEW via a liquid (water) loop. The generator, power conditioning unit and cooling system will be massive in size and weight. Thus, it is highly desirable to minimize the size and weight of high energy and DEW systems.

BRIEF DESCRIPTION OF THE INVENTION

A high energy system includes a high energy electrical device powered by an electrical generator both of which are cooled by a cryogenic liquid oxidant stored in a storage tank. A power turbine powered by a combustor using fuel and the oxidant drives the electrical generator. A turbopump powered by a portion of exhaust flow from the power turbine pumps the cryogenic liquid oxidant from the storage tank to the generator and the device.

An exemplary embodiment of the system incorporates a directed energy weapon as the electrical device, uses liquid air as the liquid oxidant, and includes a variable geometry turbine nozzle in the power turbine. A reheater may be used between a high pressure turbine and a lower pressure turbine of the power turbine. Compressor bleed from a gas turbine engine may provide air augmentation to the power turbine.

DETAILED DESCRIPTION OF THE INVENTION

Figure 1:
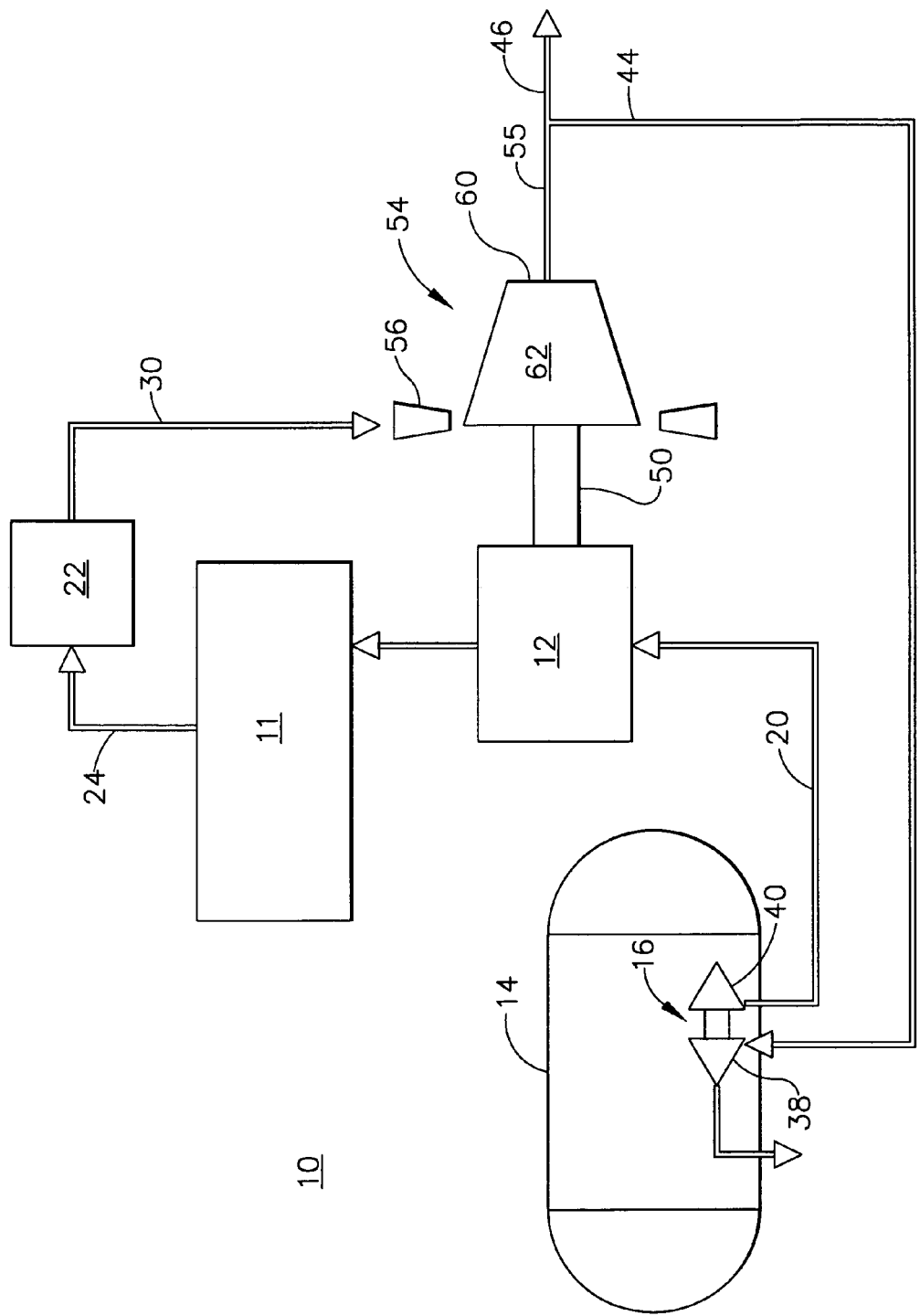
FIG. 1 is a schematical view illustration of a directed energy weapon (DEW) system exemplifying a high electrical energy system.

Illustrated in FIG. 1 is an exemplary high energy system in the form of a directed energy weapon (DEW) system 10 that incorporates very low temperature cooling and very high power to operate. A directed energy weapon (DEW) 11, representative of a high energy electrical device, is powered by a high electrical energy generator 12. The generator 12 is illustrated as a superconducting generator using very cold liquids for cooling. Liquid air (LAIR) 20 is supplied from a LAIR storage tank 14 to the generator 12 by a turbopump 16 at a pressure higher than critical pressure. The exemplary embodiment of the system 10 illustrated in FIG. 1 incorporates a power turbine 54, having a turbine nozzle 56 and a single turbine stage 52 to power the generator 12. The power turbine illustrated herein is an air turbine.

The supercritical liquid air (LAIR) 20 is pumped from the LAIR storage tank 14 by the turbopump 16 through the generator 12 to cool the generator 12 and then flowed to the DEW 11 to cool the DEW in supercritical fluid condition. Cooling of the generator 12 and the DEW 11 heats up the LAIR 20. Heat from the DEW 11 gasifies the LAIR 20 to form supercritical gaseous air 24. Energy in the form of heat picked up by the LAIR 20 from the generator 12 and the DEW 11 is recovered in the air turbine 54. The gasified air 24 is flowed from the DEW 11 to a combustor 22 in which fuel 26 is combusted with some of the gasified air 24 further raising the temperature and energy of the gasified air 24 to form a combustor outflow gas 30. The combustor outflow gas 30, which is mostly hot air and serves as a working fluid for the air turbine 54, is flowed to the air turbine 54 through the turbine nozzle 56. The turbine nozzle 56 may be a variable geometry nozzle. The liquid air 20 is used as both a cryogenic cooling fluid and provides an oxidizer for combustion in the combustor 22. As such other cryogenic fluid oxidizers may be used instead of LAIR.

The generator 12 is directly connected by a drive shaft 50 to the air turbine 54. The air turbine 54 discharges air turbine exhaust flow 55 through its turbine exit 60. A first portion 44 of the air turbine exhaust flow 55 is flowed to a turbopump turbine 38 of the turbopump 16. The turbopump turbine 38 drives a pump 40 of the turbopump 16 to pump the LAIR 20 from the LAIR storage tank 14 to the generator 12. A remaining portion 46 of the air turbine exhaust flow 55 is exhausted or dumped.

The liquid pump 40, in one example, compresses the LAIR 20 to over 1500 psia. Thus, the air density into the air turbine 54 is about 6 times higher than for a gas turbine engine. This results in a much smaller turbine wheel for the air turbine 54. Additionally, the power to compress liquid is significantly less than the power to compress gas if a gas turbine engine was used to power the DEW. The turbopump 16 is powered by the same gas which powers the air turbine 54 and, in turn, the generator 12.

The air turbine 54 and the generator 12 may be a very high speed turbogenerator designed to operate at very high rpm, for example 75000 rpm. Thus, for the same horsepower the torque required from the turbine is much less than for a gas turbine engine running at about 15000 rpm. With these very high speeds, the turbogenerator can run on air bearings which can reduce or eliminate the need for lubrication and affords very long service life since there is no bearing fatigue. The turbogenerator does not need to be located near a turbine engine (which requires a suitable air inlet and exhaust) and can be located near the DEW. This eliminates long heavy electrical cables and resistance power loss.

The air turbine 54 may be a closed-loop controlled variable geometry turbine nozzle 56. For an AC generator electrical frequency is constant. For a DC generator speed can be adjusted to maintain constant voltage with varying electrical load. Instead of a large power conditioning unit, the invention requires only a small voltage regulator and an AC/DC rectifier (DC machine).

To further optimize the DEW system and mission, the LAIR storage tank 14 may also serve as a fuel tank. In the case of an aircraft mounted version of the directed energy weapon (DEW) system 10, the aircraft flies to its target area where the now empty fuel tank is aerial filled with LAIR 20. During the return flight, the tank may be refilled with fuel.

Figure 2:
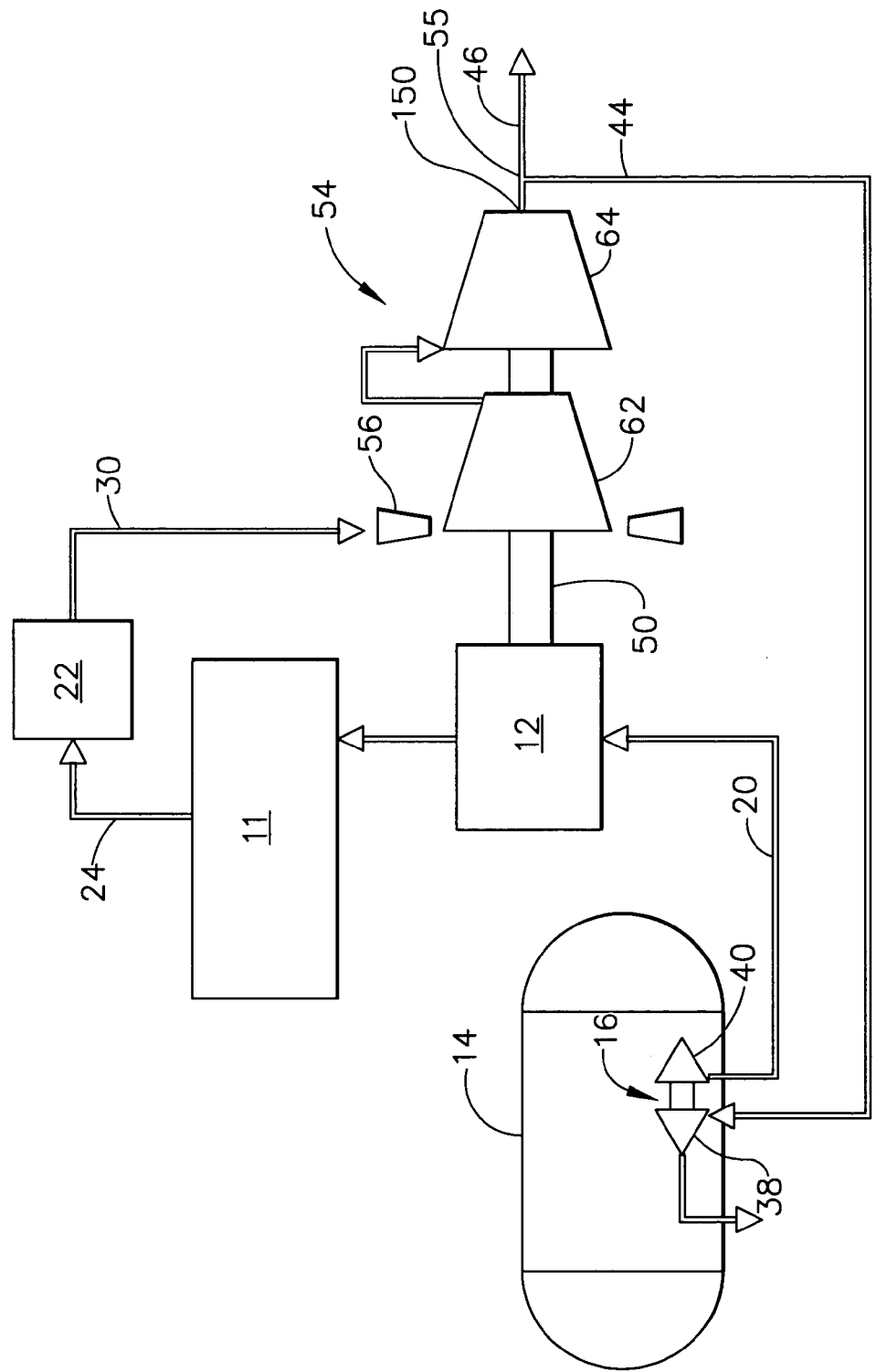
FIG. 2 is a schematical view illustration of a directed energy weapon (DEW) system with a two stage power turbine.
Figure 3:
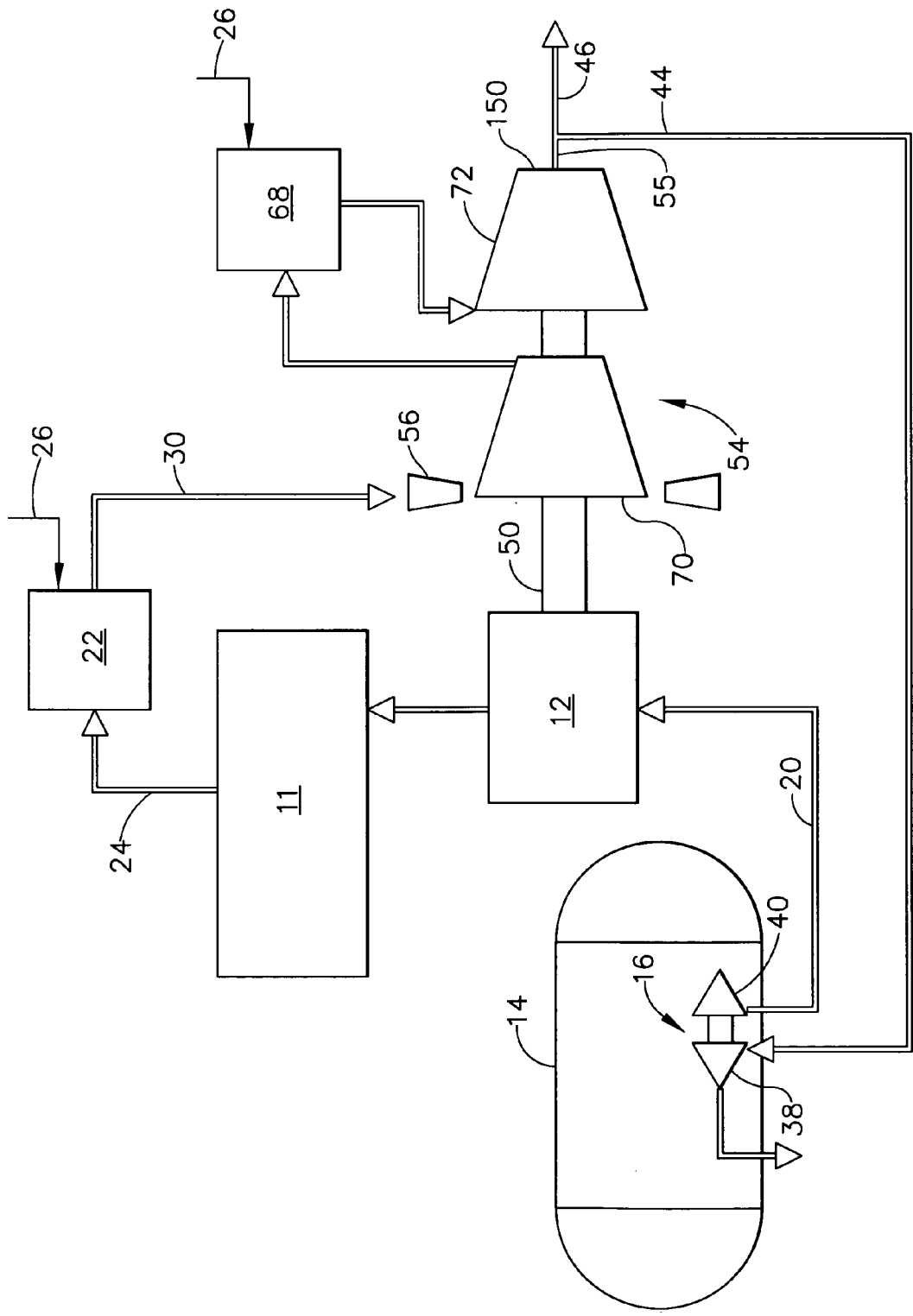
FIG. 3 is a schematical view illustration of a directed energy weapon (DEW) system with a reheater between the two turbine stages in the two stage power turbine illustrated in FIG. 2.

A second exemplary high energy system in the form of a directed energy weapon (DEW) system 10 is illustrated in FIG. 2. The air turbine 54 includes the variable geometry turbine nozzle 56 but has two turbine stages denoted as first and second turbine stages 62 and 64, respectively. This multistage air turbine extracts more energy from the available gas pressure than would be extracted with a single stage turbine. A third exemplary high energy system in the form of a directed energy weapon (DEW) system 10 is illustrated in FIG. 3 and includes a reheater 68 in which more fuel 26 is combusted to provide combustion reheat between a high pressure turbine 70 and a lower pressure turbine 72 in the air turbine 54.

Figure 4:
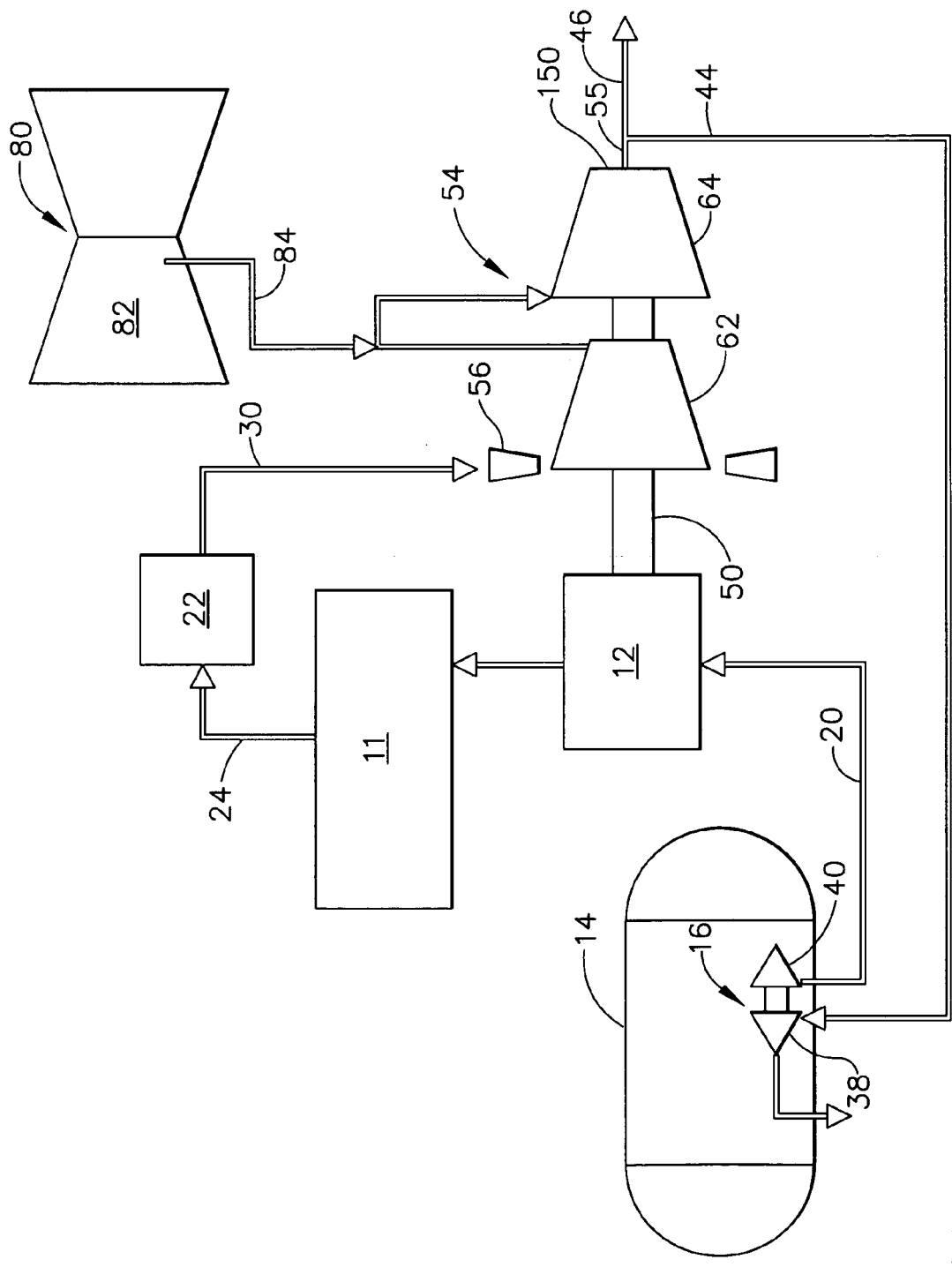
FIG. 4 is a schematical view illustration of a directed energy weapon (DEW) system illustrated in FIG. 2 with air augmentation from a gas turbine engine.
Figure 5:
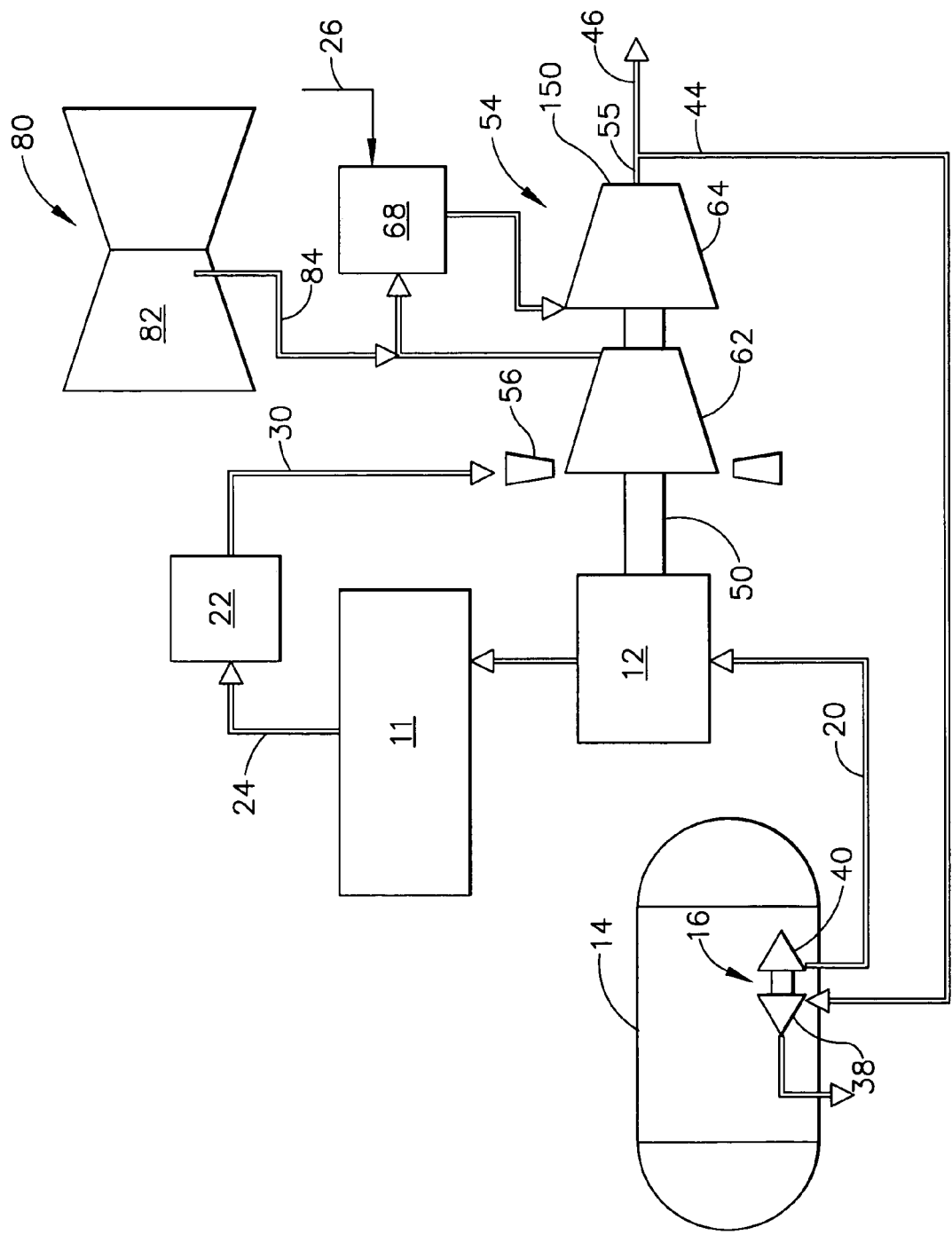
FIG. 5 is a schematical view illustration of a directed energy weapon (DEW) system with a reheater between the two turbine stages in the two stage power turbine illustrated in FIG. 4.

A fourth and fifth exemplary high energy system in the form of a directed energy weapon (DEW) system 10 is illustrated in FIGS. 4 and 5 and adds air augmentation from a gas turbine engine 80 by selectively bleeding the engine's air compressor 82. This results in a smaller LAIR tank 14 being needed. Supplemental compressed air 84 is ducted from the engine's air compressor 82 to the lower pressure turbine 72 in the air turbine 54, where together with first stage turbine exhaust air 86 exhausted from the high pressure turbine 70, it is used to power the lower pressure turbine 72.

In the directed energy weapon (DEW) system 10 illustrated in FIG. 5, the supplemental compressed air 84 and the first stage turbine exhaust air 86 are passed through the reheater 68 in which more fuel 26 is combusted to provide combustion reheat between the high pressure turbine 70 and the lower pressure turbine 72. The supplemental compressed air 84 is ducted from the engine's air compressor 82 to the air turbine 54 or alternatively to the reheater 68 and, thus, short electrical cables may still be used.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A high energy system comprising:
   a high energy electrical device,
   an electrical generator in power supply relationship to the device,
   a cryogenic storage tank in cooling supply relationship to the electrical generator and the high energy electrical device,
   a combustor in oxidant receiving relationship with the high energy electrical device,
   a power turbine drivingly connected to the electrical generator and in working fluid receiving relationship with the combustor,
   a turbopump including a turbopump turbine drivingly connected to a pump and operable to pump a cryogenic fluid oxidant from the storage tank to the generator and the device, and
   the turbopump turbine in turbine exhaust flow receiving relationship with the power turbine.

2. A system as claimed in claim 1 further comprising a variable geometry turbine nozzle in the power turbine.

3. A system as claimed in claim 1 further comprising the power turbine having at least two turbine stages.

4. A system as claimed in claim 3 further comprising a variable geometry turbine nozzle in the turbine.

5. A system as claimed in claim 1 further comprising a high pressure turbine and a lower pressure turbine in the power turbine.

6. A system as claimed in claim 5 further comprising a variable geometry turbine nozzle in the power turbine.

7. A system as claimed in claim 6 further comprising a gas turbine engine including an air compressor in selective bleed air supply communication with the lower pressure turbine.

8. A system as claimed in claim 7 further comprising a reheater between the high pressure turbine and the lower pressure turbine.

9. A system as claimed in claim 1 further comprising liquid air stored in the cryogenic storage tank.

10. A system as claimed in claim 9 further comprising a variable geometry turbine nozzle in the power turbine.

11. A system as claimed in claim 9 further comprising a high pressure turbine and a lower pressure turbine in the power turbine.

12. A system as claimed in claim 11 further comprising a variable geometry turbine nozzle in the power turbine.

13. A system as claimed in claim 12 further comprising a gas turbine engine including an air compressor in selective bleed air supply communication with the lower pressure turbine.

14. A system as claimed in claim 12 further comprising a reheater between the high pressure turbine and the lower pressure turbine.

15. A system as claimed in claim 1 further comprising liquid air stored in the cryogenic storage tank and the device being a directed energy weapon.

16. A system as claimed in claim 15 further comprising a variable geometry turbine nozzle in the power turbine.

17. A system as claimed in claim 15 further comprising a high pressure turbine and a lower pressure turbine in the power turbine and a variable geometry turbine nozzle in the power turbine.

18. A system as claimed in claim 17 further comprising a gas turbine engine including an air compressor in selective bleed air supply communication with the lower pressure turbine.

19. A system as claimed in claim 18 further comprising a reheater between the high pressure turbine and the lower pressure turbine.

20. A system as claimed in claim 19 wherein the generator is a superconducting generator.

21. A system as claimed in claim 15 further comprising:
    the weapon system being mounted in a gas turbine engine powered aircraft, and
    the storage tank being operable to alternatively store the cryogenic fluid oxidant and gas turbine engine fuel to power the aircraft during a single mission of the aircraft.

22. A system as claimed in claim 21 further comprising aircraft and the storage tank being operable to store and partially fuel the gas turbine engine as the aircraft flies to a target area then fill the storage tank with the cryogenic fluid oxidant, then operate the weapon system using the cryogenic fluid oxidant.

* * * * *